(12) United States Patent
Pasuri

(10) Patent No.: US 7,671,548 B2
(45) Date of Patent: Mar. 2, 2010

(54) ELECTRIC DRIVE SYSTEM

(75) Inventor: Osmo Pasuri, Ojakkala (FI)

(73) Assignee: ABB Oy, Helsinki (FI)

( * ) Notice: Subject to any disclaimer, the term of this patent is extended or adjusted under 35 U.S.C. 154(b) by 311 days.

(21) Appl. No.: 11/806,641

(22) Filed: Jun. 1, 2007

(65) Prior Publication Data

US 2007/0290634 A1 Dec. 20, 2007

(30) Foreign Application Priority Data

Jun. 6, 2006 (FI) .................................. 20065382

(51) Int. Cl.
*H02P 5/00* (2006.01)
*H02P 1/54* (2006.01)

(52) U.S. Cl. .......................... 318/49; 318/66; 318/630; 318/568.11; 700/34; 700/85; 700/95

(58) Field of Classification Search ................. 318/562, 318/567, 569, 625, 49, 66, 630, 568.11, 568.2; 700/251, 252, 34, 85, 95; 440/87
See application file for complete search history.

(56) References Cited

U.S. PATENT DOCUMENTS

| | | | | | |
|---|---|---|---|---|---|
| 4,503,507 | A | * | 3/1985 | Takeda et al. | 700/249 |
| 4,625,285 | A | * | 11/1986 | Mori et al. | 700/251 |
| 4,698,777 | A | * | 10/1987 | Toyoda et al. | 700/252 |
| 4,864,204 | A | * | 9/1989 | Daggett et al. | 318/568.2 |
| 4,868,472 | A | * | 9/1989 | Daggett | 318/568.2 |
| 4,874,997 | A | * | 10/1989 | Daggett et al. | 318/568.1 |
| 4,878,002 | A | * | 10/1989 | Heatzig et al. | 318/568.2 |
| 4,888,534 | A | * | 12/1989 | Kuchiki | 318/567 |
| 4,914,364 | A | * | 4/1990 | Hirai | 318/590 |
| 4,963,803 | A | * | 10/1990 | Kokura | 318/569 |
| 5,010,285 | A | * | 4/1991 | Kawamura et al. | 318/569 |
| 5,013,989 | A | * | 5/1991 | Kurakake et al. | 318/625 |
| 5,025,393 | A | * | 6/1991 | Naito | 700/264 |

(Continued)

FOREIGN PATENT DOCUMENTS

JP 11-259134 A 9/1999

(Continued)

OTHER PUBLICATIONS

Mohan, N. "Electric Drives an Integrative Approach", MNPERE, Minneapolis, 2000, pp. 1-4.

(Continued)

*Primary Examiner*—Paul Ip
(74) *Attorney, Agent, or Firm*—Buchanan Ingersoll & Rooney PC

(57) ABSTRACT

An electric drive system comprising several electric drives, each of which comprises an electric motor, and a control system which is arranged to control said several electric drives and comprises a first outer controller and a first speed controller. A signal supplied to the input of the first speed controller is generated by using the output signal of said first outer controller, and the first speed controller is arranged to generate an output torque signal at its output. The control system further comprises a torque controller per each electric drive, which torque controller is arranged to control the torque of the corresponding electric motor. A signal supplied to the input of each torque controller is generated by using the output torque signal of the first speed controller.

23 Claims, 1 Drawing Sheet

U.S. PATENT DOCUMENTS

| | | | |
|---|---|---|---|
| 5,032,975 A * | 7/1991 | Yamamoto et al. | 700/5 |
| 5,053,972 A * | 10/1991 | Kurakake et al. | 700/170 |
| 5,136,222 A * | 8/1992 | Yamamoto et al. | 318/568.2 |
| 5,237,250 A * | 8/1993 | Zeile et al. | 318/562 |
| 5,241,250 A * | 8/1993 | Nagasawa et al. | 318/591 |
| 5,268,898 A * | 12/1993 | Kazato | 370/447 |
| 5,444,343 A * | 8/1995 | Enomoto et al. | 318/568.11 |
| 5,646,495 A | 7/1997 | Toyozawa et al. | |
| 5,963,712 A * | 10/1999 | Fujita et al. | 700/264 |
| 5,990,638 A * | 11/1999 | Aoyama et al. | 318/85 |
| 5,994,861 A * | 11/1999 | Tutumishita | 318/562 |
| 7,023,169 B2 * | 4/2006 | Erkkilä et al. | 318/779 |
| 7,180,261 B1 * | 2/2007 | Tsai | 318/625 |
| 2005/0052144 A1 | 3/2005 | Matsubara et al. | |
| 2005/0170716 A1 * | 8/2005 | Ylitalo | 440/87 |

FOREIGN PATENT DOCUMENTS

JP     2004-64866 A     2/2004

OTHER PUBLICATIONS

Finnish Office Action.

* cited by examiner

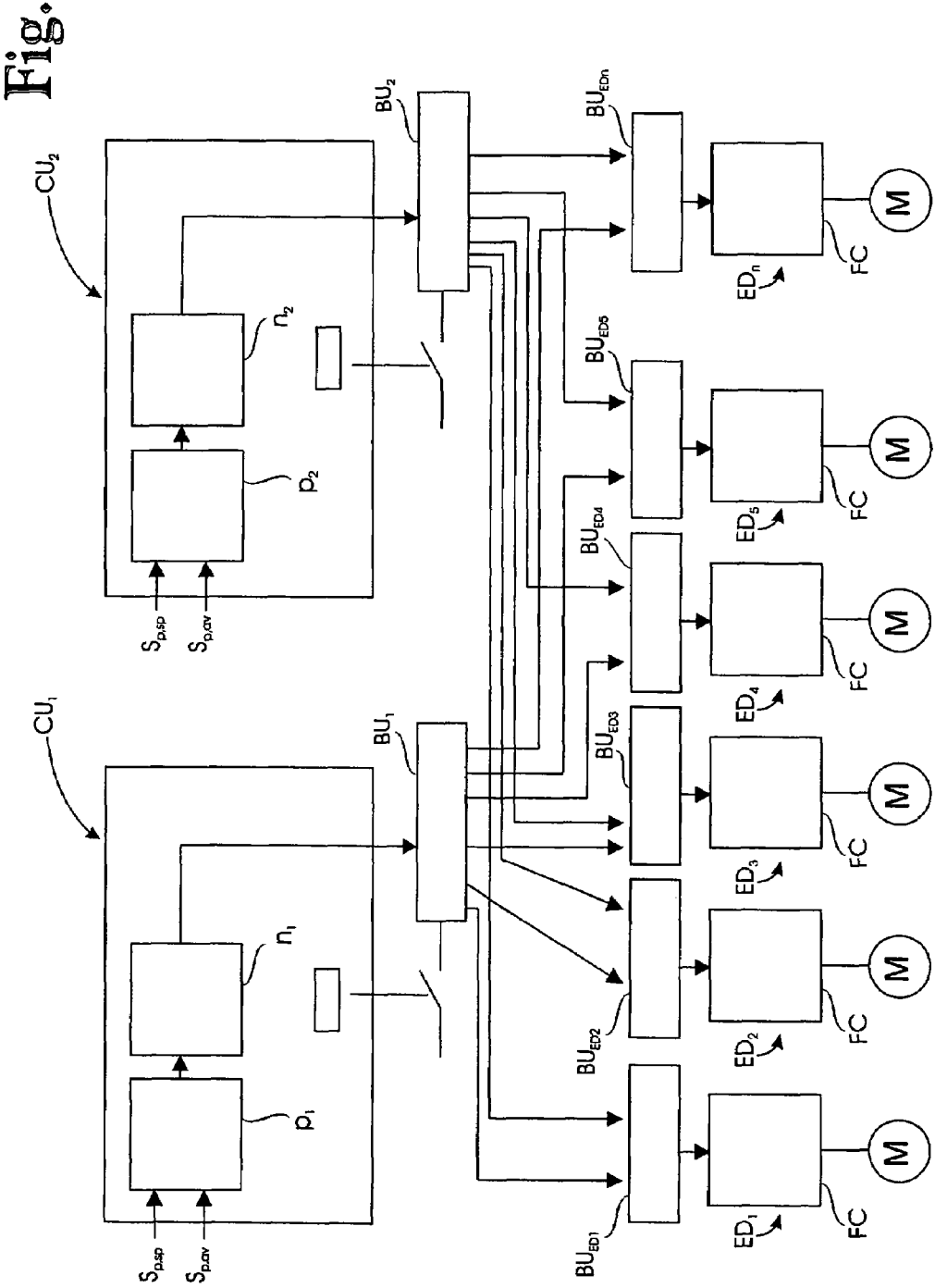

ELECTRIC DRIVE SYSTEM

TECHNICAL FIELD

The invention relates to an electric drive system according to the independent claim.

BACKGROUND INFORMATION

Electric drive systems comprising several electric drives are usually controlled in such a way that one of the electric drives is a master unit, the other electric drives being slave units that tend to follow the operation of the master unit. A problem with such a known electric drive system is that failure of the master unit may stop the whole electric drive system. For this reason, an electric drive system of this kind is not applicable to objects of use where high reliability is required.

SUMMARY

An object of the invention is to provide an electric drive system in which failure of a single electric drive or even several electric drives does not stop the operation of the electric drives still in order. The object of the invention is achieved with an electric drive system characterized by what is stated in the independent claim. Preferred embodiments of the invention are disclosed in the dependent claims.

The invention is based on the idea that the electric drive system comprises one torque controller per each electric drive as well as a speed controller shared by these torque controllers and arranged to generate a common output torque signal, on the basis of which each torque controller is controlled and each torque controller controls the torque of the corresponding electric motor.

An advantage of the electric drive system of the invention is that the electric drives operate completely independently of each other, whereby not even failure of several electric drives affects the operation of the electric drives still in order.

BRIEF DESCRIPTION OF THE DRAWING

The invention will now be described in greater detail in connection with preferred embodiments, referring to:

FIG. 1, which shows an electric drive system according to one embodiment.

DETAILED DESCRIPTION

The electric drive of FIG. 1 comprises several electric drives $ED_1$ to $ED_n$, and a control system arranged to control said several electric drives. The control system comprises a first control unit $CU_1$ and a second control unit $CU_2$ connected redundantly.

The electric drives $ED_1$ to $ED_n$ are identical. Each electric drive comprises a frequency converter FC and an electric motor M fed by the frequency converter. Each frequency converter is provided with a torque controller arranged to control the torque of the corresponding electric motor.

The control units $CU_1$ and $CU_2$ are identical. Both control units comprise a position controller and a speed controller. The position controller of the first control unit $CU_1$ is denoted as $p_1$ in FIG. 1, and the speed controller of the first control unit is denoted as $n_1$. The position controller of the second control unit $CU_2$ is denoted as $p_2$ in FIG. 1, and the speed controller of the second control unit is denoted as $n_2$.

The control system is a feedback control system comprising a closed control loop. Each position controller has two inputs, a position setpoint value signal $S_{p,sp}$ being supplied to the first input, and a position current value signal $S_{p,av}$ being supplied to the second input. The position controller generates a speed instruction signal by means of the position setpoint value signal $S_{p,sp}$ and the position current value signal $S_{p,av}$, and feeds the speed instruction signal to the input of the speed controller via the output of the position controller. The speed controller generates an output torque signal by means of the speed instruction signal and feeds it to its output.

The electric drive system comprises a first upper branch unit $BU_1$ and a second upper branch unit $BU_2$, as well as one lower branch unit $BU_{ED1}$ to $BU_{EDn}$ per each electric drive $ED_1$ to $ED_n$. The control units $CU_1$ and $CU_2$ are connected by way of data communications to the electric drives via upper branch units and lower branch units.

The output of each control unit is connected by way of data communications to the corresponding upper branch unit. The output of the first control unit $CU_1$ is connected to the input of the first upper branch unit $BU_1$, and the output of the second control unit $CU_2$ is connected to the input of the second upper branch unit $BU_2$. Each upper branch unit has, per each electric drive, one output that is connected by way of data communications to the lower branch unit corresponding to the electric drive in question.

Each lower branch unit has two inputs, the first one being arranged to receive signals from the first upper branch unit $BU_1$ and the second one being arranged to receive signals from the second upper branch unit $BU_2$. The output of each lower branch unit is connected by way of data communications to the frequency converter of the corresponding electric drive, in other words the output of the lower branch unit $BU_{ED1}$ is connected to the frequency converter of the electric drive $ED_1$, the output of the lower branch unit $BU_{ED2}$ is connected to the frequency converter of the electric drive $ED_2$, and so on.

If required, a second input can be provided (not shown) for each speed controller, to which input the speed current value signal is supplied from a process in the operation of which the electric drives participate. Correspondingly, the torque controller of each electric drive may comprise an input to which the torque current value signal is supplied.

The upper branch units and the lower branch units can be arranged in such a way that they do not modify the output torque signal sent by the control unit but merely transmit it from the control unit to the electric drive. The output torque signal thus functions as the torque setpoint value signal, i.e. as the torque instruction. Thus, the system may be arranged such that an active control unit sends a percentage value as the torque instruction to the electric drives, which percentage value expresses how many percent of the added maximum power of the electric drives the desired total power of the electric drives is, whereby the torque controller of each electric drive controls the corresponding electric motor to produce the amount of this percentage value of the maximum power of the electric motor. The control system may comprise feedback arranged to transmit information on the failure of one or more electric drives to the control unit, whereby control unit may take into account the reduction in the added maximum power of the electric drives when determining the percentage value of the torque instruction.

Since each electric drive comprises a torque controller of its own, failure or switching out of one individual electric drive or even several electric drives does not affect the operation of the electric drives still in order.

In accordance with the above description, the speed controller generates an output torque signal, on the basis of which the torque controller of each electric drive controls the torque of the corresponding electric motor. The type of the output torque signal generated by the speed controller as well as the type of the torque controller is selected on the basis of the object of application and the type of the electric motors used. In one embodiment, the electric motors are squirrel cage motors, and the torque controller is a controller of the PI type. Alternatively, the electric motors may be direct-current motors, in which case the torque of the motors is controlled by controlling the current of the motors.

The control units $CU_1$ and $CU_2$ are connected redundantly in such a way that only one of the control units is active at a time. A situation is prevented in which both the first control unit $CU_1$ and the second control unit $CU_2$ would send a torque instruction to the electric drives simultaneously. In a normal use situation one control unit is active, another one serving as a stand-by unit. When the active control unit fails, the stand-by control unit may be activated while the controls of the electric drives continue as before.

The active control unit is selected with auxiliary voltages of the upper branch units $BU_1$ and $BU_2$ and by means of control by the control units $CU_1$ and $CU_2$. Changing active control units may also be carried out with a manual selector switch.

The electric drive system according to FIG. 1 can be arranged to turn the steering propeller element of a ship provided with a steering propeller system relative to the hull of the ship. Thus, the electric motors M of the electric drives $ED_1$ to $ED_n$ are arranged to turn the steering propeller element, and the position controller is arranged to control the turning process of said steering propeller element. The position setpoint value signal $S_{p,sp}$ provides the control system of the electric drive system with information on the desired position of the steering propeller element, i.e. the desired turning angle of the steering propeller element. The position setpoint value signal of the steering propeller element is supplied to the position controller from a control apparatus of the ship, for example from the steering wheel apparatus. The position current value signal $S_{p,av}$ of the steering propeller element is supplied to the position controller from sensor means installed in connection with the steering propeller element. If the speed current value signal were supplied to each speed controller, this signal would represent the real value of the turning speed of the steering propeller element.

In alternative embodiments of the invention, the electric drive system according to FIG. 1 may be arranged to turn for instance a roller in a steel rolling mill, in which case the position controller controls the position of the roller, or it may be arranged to move a conveyor of a conveyor system, in which case the position controller controls the position of the conveyor.

Further, in alternative embodiments of the invention the outer controller, the output signal of which is used to generate the signal to be supplied to the input of the speed controller, may be for example a pressure controller, a flow rate controller or a tension controller instead of a position controller. A pressure controller and a flow rate controller may be arranged to control the pressure and flow of gas or liquid, respectively, in an industrial process. A tension controller may be arranged to control the tension of a paper web or of the anchor chain of a boat, for example.

It will be obvious to a person skilled in the art that the basic idea of the invention can be implemented in a plurality of ways. Thus, the invention and its embodiments are not restricted to the examples presented but may vary within the scope of the claims.

What is claimed is:

1. An electric drive system, comprising:
   several electric drives, each of which comprises an electric motor, and
   a control system which is arranged to control said several electric drives and comprises a first outer controller and a first speed controller,
   wherein a signal supplied to the input of the first speed controller is generated by using the output signal of said first outer controller, and the first speed controller is arranged to generate an output torque signal at its output,
   the control system further comprising a torque controller for each electric drive, respectively, each torque controller being arranged to control the torque of the corresponding electric motor, and a signal supplied to the input of each torque controller is generated by using the output torque signal of the first speed controller.

2. An electric drive system according to claim 1, wherein the first speed controller generates precisely one output torque signal that is shared by all of the torque controllers.

3. An electric drive system according to claim 2, wherein each torque controller is located at the corresponding electric drive.

4. An electric drive system according to claim 3, wherein each electric drive comprises a frequency converter configured feed the corresponding electric motor.

5. An electric drive system according to claim 4, wherein the control system is a feedback control system, and at least one feedback signal is supplied to an input of the first outer controller, which feedback signal is related to the state of a process for which the electric motors of the electric drives are configured to give driving power.

6. An electric drive system according to claim 5, wherein the first outer controller is one of a position controller, a pressure controller, a flow controller and a tension controller.

7. An electric drive system according to claim 1, wherein the electric drive system is configured to turn the steering propeller element of a ship provided with a steering propeller system relative to the hull of the ship, and the first outer controller is a position controller of the steering propeller element.

8. An electric drive system according to claim 7, wherein the control system further comprises a second outer controller and a second speed controller, wherein a unit comprising the second outer controller and the second speed controller is connected redundantly with a unit comprising the first outer controller and the first speed controller.

9. An electric drive system according to claim 8, wherein the first speed controller generates precisely one output torque signal that is shared by all of the torque controllers.

10. An electric drive system according to claim 9, wherein each torque controller is located at the corresponding electric drive.

11. An electric drive system according to claim 10, wherein each electric drive comprises a frequency converter configured to feed the corresponding electric motor.

12. An electric drive system according to claim 11, wherein the control system is a feedback control system, and at least one feedback signal is supplied to an input of the position controller of the steering propeller element, the at least one feedback signal being related to the position of the steering propeller element.

13. An electric drive system, comprising:
electric drives, each of which comprises an electric motor, and
a control system configured to control said electric drives, the control system comprising:
a first outer controller configured to generate an output signal,
a first speed controller configured to generate an output torque signal based on the output signal, and
a torque controller for each electric drive, respectively, each torque controller being configured to control the torque of the corresponding electric motor based on the output torque signal of the first speed controller.

14. An electric drive system according to claim 13, wherein the first speed controller generates precisely one output torque signal that is shared by all of the torque controllers.

15. An electric drive system according to claim 13, wherein each torque controller is located at the corresponding electric drive.

16. An electric drive system according to claim 13, wherein each electric drive comprises a frequency converter configured to feed the corresponding electric motor.

17. An electric drive system according to claim 13, wherein the control system is a feedback control system, and at least one feedback signal is supplied to an input of the first outer controller, the at least one feedback signal being related to the state of a process for which the electric motors of the electric drives are configured to give driving power.

18. An electric drive system according to claim 13, wherein the first outer controller is one of a position controller, a pressure controller, a flow controller and a tension controller.

19. An electric drive system according to claim 13, wherein the electric drive system is configured to turn the steering propeller element of a ship provided with a steering propeller system relative to the hull of the ship, and the first outer controller is a position controller of the steering propeller element.

20. An electric drive system according to claim 13, wherein the control system further comprises a redundant control unit including a second outer controller and a second speed controller, wherein the redundant control unit is configured to replace the first outer controller and the first speed controller with the second outer controller and the second speed controller, respectively, in the event of a failure with at least one of the first outer controller and the first speed controller.

21. An electric drive system according to claim 13, wherein the output torque signal is indicative of a desired total power of the electric drives as a percentage of a total maximum power of the electric drives, and the torque controller of each electric drive is configured to control the corresponding electric motor to substantially produce a power corresponding to said percentage.

22. An electric drive system according to claim 21, wherein the control system is configured to determine the total maximum power of the electric drives based on information about a failure of at least one of the electric drives.

23. An electric drive system according to claim 13, wherein the output torque signal is indicative of a desired drive power, and the torque controller of each electric drive is configured to control the corresponding electric motor to be driven at the desired drive power.

* * * * *